(12) United States Patent

Wei et al.

(10) Patent No.: US 12,561,071 B2

(45) Date of Patent: Feb. 24, 2026

(54) MEMORY, OPERATION METHOD THEREOF, MEMORY SYSTEM AND ELECTRONIC APPARATUS

(71) Applicant: YANGTZE MEMORY TECHNOLOGIES CO., LTD., Wuhan (CN)

(72) Inventors: Debo Wei, Wuhan (CN); HuangPeng Zhang, Wuhan (CN); Jinze Song, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/543,965

(22) Filed: Dec. 18, 2023

(65) Prior Publication Data

US 2025/0094060 A1 Mar. 20, 2025

(30) Foreign Application Priority Data

Sep. 20, 2023 (CN) ......................... 202311220208.X

(51) Int. Cl.
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2014/0192605 A1* | 7/2014 | Crawford | G06F 3/0673 |
| | | | 365/222 |
| 2018/0166123 A1* | 6/2018 | Goto | G11C 11/40618 |
| 2020/0159441 A1* | 5/2020 | Mayer | G11C 7/04 |
| 2020/0176047 A1* | 6/2020 | Meier | G11C 11/40626 |
| 2020/0341840 A1* | 10/2020 | Chang | G06F 13/1668 |
| 2020/0371873 A1* | 11/2020 | Schaefer | H03M 13/458 |
| 2021/0020231 A1* | 1/2021 | Deng | G11C 11/40611 |
| 2022/0137827 A1* | 5/2022 | Schaefer | G06F 3/0655 |
| | | | 711/154 |

* cited by examiner

*Primary Examiner* — Jared I Rutz
*Assistant Examiner* — Alexander J Yoon
(74) *Attorney, Agent, or Firm* — Conley Rose, P.C.

(57) ABSTRACT

Examples of the present disclosure provide a memory, an operation method thereof, a memory system and an electronic apparatus. The memory includes a peripheral circuit and the peripheral circuit includes a first register circuit configured to store a plurality of initial refresh rates that are in one-to-one correspondence to a plurality of initial temperature sections; a temperature sensing circuit configured to sense a temperature of the memory and generate a temperature signal based on the sensed temperature; and a control logic circuit configured to determine a target configuration refresh rate based on the temperature signal and a configuration mapping table and adjust a target initial refresh rate of the plurality of initial refresh rates to the target configuration refresh rate, wherein the configuration mapping table includes a plurality of configuration temperature sections and a plurality of configuration refresh rates that are in one-to-one correspondence.

19 Claims, 12 Drawing Sheets

300

| FUNCTION | REGISTER | REFRESH RATE CODE | INITIAL REFRESH RATE |
|---|---|---|---|
| REFRESH RATE | READ ONLY | 5'b00000 | LOW TEMPERATURE LIMIT |
| | | 5'b00001 | 8x |
| | | 5'b00010 | 6x |
| | | 5'b00011 | 4x |
| | | 5'b00100 | 3.3x |
| | | 5'b00101 | 2.5x |
| | | 5'b00110 | 2.0x |
| | | 5'b00111 | 1.7x |
| | | 5'b01000 | 1.3x |
| | | 5'b01001 | 1x |
| | | 5'b01010 | 0.7x |
| | | 5'b01011 | 0.5x |
| | | 5'b01100 | 0.25x NO DE-RATING |
| | | 5'b01101 | 0.25x WITH DE-RATING |
| | | 5'b01110 | 0.125x NO DE-RATING |
| | | 5'b01111 | 0.125x WITH DE-RATING |
| | | 5'b11111 | HIGH TEMPERATURE LIMIT |

FIG. 6

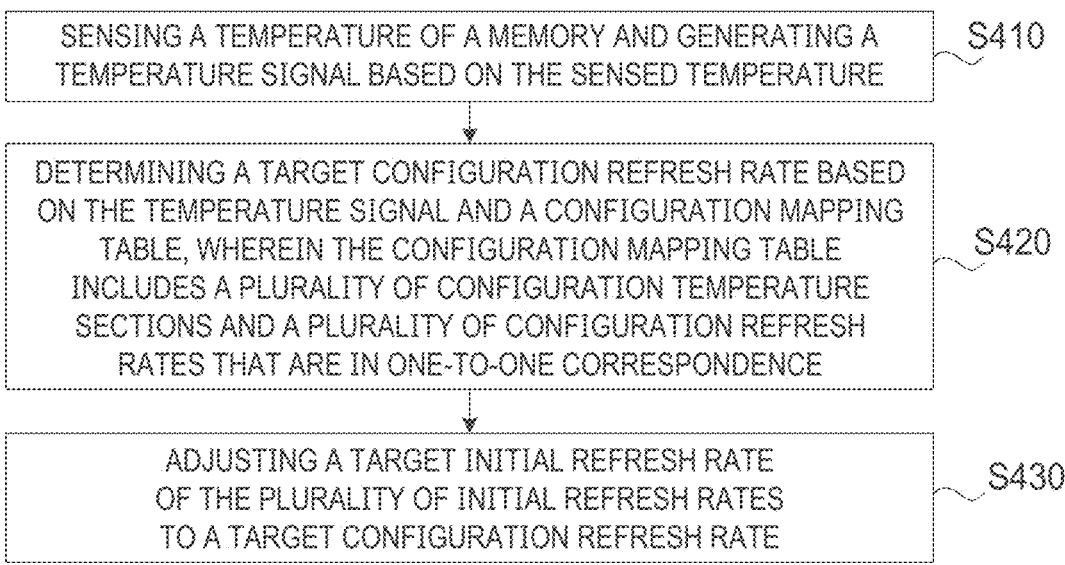

SENSING A TEMPERATURE OF A MEMORY AND GENERATING A TEMPERATURE SIGNAL BASED ON THE SENSED TEMPERATURE — S410

DETERMINING A TARGET CONFIGURATION REFRESH RATE BASED ON THE TEMPERATURE SIGNAL AND A CONFIGURATION MAPPING TABLE, WHEREIN THE CONFIGURATION MAPPING TABLE INCLUDES A PLURALITY OF CONFIGURATION TEMPERATURE SECTIONS AND A PLURALITY OF CONFIGURATION REFRESH RATES THAT ARE IN ONE-TO-ONE CORRESPONDENCE — S420

ADJUSTING A TARGET INITIAL REFRESH RATE OF THE PLURALITY OF INITIAL REFRESH RATES TO A TARGET CONFIGURATION REFRESH RATE — S430

FIG. 9

MEMORY, OPERATION METHOD THEREOF, MEMORY SYSTEM AND ELECTRONIC APPARATUS

CROSS-REFERENCE TO RELATED APPLICATIONS

The present application claims priority to Chinese Patent Application No. 202311220208X, which was filed Sep. 20, 2023, is titled "MEMORY AND ITS OPERATING METHOD, MEMORY SYSTEM AND ELECTRONIC EQUIPMENT," and is hereby incorporated herein by reference in its entirety.

TECHNICAL FIELD

Examples of the present disclosure relate to semiconductor technology, and in particular to, but are not limited to, a memory, an operation method thereof, a memory system and an electronic apparatus.

BACKGROUND

Semiconductor memories are classified into volatile memories and non-volatile memories depending on whether the stored data are retained when power is off. Volatile memories in which the stored data will be lost when power is off may include static random-access memories (SRAM) and dynamic random access memories (DRAM).

SUMMARY

In view of this, examples of the present disclosure provide a memory, an operation method thereof, a memory system and an electronic apparatus.

In the first aspect, examples the present disclosure provide a memory including a peripheral circuit. The peripheral circuit includes: a first register circuit configured to store a plurality of initial refresh rates that are in one-to-one correspondence to a plurality of initial temperature sections; a temperature sensing circuit configured to sense the temperature of the memory and generate a temperature signal based on the sensed temperature; and a control logic circuit configured to determine a target configuration refresh rate based on the temperature signal and a configuration mapping table and adjust a target initial refresh rate of the plurality of initial refresh rates to the target configuration refresh rate, wherein the configuration mapping table includes a plurality of configuration temperature sections and a plurality of configuration refresh rates that are in one-to-one correspondence.

In some examples, the peripheral circuit further includes: a second register circuit configured to store the configuration mapping table; and the control logic circuit is configured to read the second register circuit based on the temperature signal and determine the target configuration refresh rate.

In some examples, the configuration mapping table includes a plurality of sub-configuration mapping tables for recording the correspondence relationship between the configuration temperature sections and the configuration refresh rates and the peripheral circuit further includes: an address decoding circuit configured to decode and generate a target address based on the temperature signal, wherein the target address is configured to indicate the physical address of the target sub-configuration mapping table of the plurality of sub-configuration mapping tables; and the control logic circuit is configured to obtain the target sub-configuration mapping table based on the target address and determine the target configuration refresh rate.

In some examples, the first register circuit is further configured to: update the target initial refresh rate to the target configuration refresh rate; and send the target configuration refresh rate to a memory controller.

In some examples, the peripheral circuit further includes: a fuse circuit configured to store the configuration mapping table; and the control logic circuit is configured to read the configuration mapping table in the fuse circuit and store the read configuration mapping table in the second register circuit.

In some examples, the initial refresh rate includes a basic refresh rate and an initial multiple value and any two initial refresh rates of the plurality of initial refresh rates have different initial multiple values; and the configuration refresh rate includes the basic refresh rate and a configuration multiple value and any two configuration refresh rates of the plurality of configuration refresh rates have different configuration multiple values; the control logic circuit is configured to determine the configuration multiple value of the target configuration refresh rate based on the temperature signal and the configuration mapping table; and the first register circuit is further configured to update the initial multiple value of the target initial refresh rate to the configuration multiple value of the target configuration refresh rate.

In some examples, the plurality of initial temperature sections include N initial temperature sections with N being an integer larger than 1; the configuration mapping table includes N configuration temperature sections, wherein the lowest temperature of the ith initial temperature section is different from the lowest temperature of the ith configuration temperature section; and/or the highest temperature of the ith initial temperature section is different from the highest temperature of the ith configuration temperature section with i being an integer larger than or equal to 1 and smaller than or equal to N.

In some examples, the control logic circuit is further configured to: enter a refresh mode based on the current refresh command sent from the memory controller; and enter the refresh mode based on the next refresh command sent from the memory controller, wherein the target configuration refresh rate is configured to indicate the time interval between the next refresh command and the current refresh command.

In some examples, the memory is further configured to: update at least one of the configuration temperature sections in the configuration mapping table when the usage time of the memory is longer than or equal to a preset duration.

In the second aspect, examples of the present disclosure further provide an operation method of a memory including a peripheral circuit that includes a first register circuit configured to store a plurality of initial refresh rates in one-to-one correspondence to a plurality of initial temperature sections. The operation method includes: sensing a temperature of the memory and generating a temperature signal based on the sensed temperature; determining a target configuration refresh rate based on the temperature signal and a configuration mapping table, wherein the configuration mapping table includes a plurality of configuration temperature sections and a plurality of configuration refresh rates that are in one-to-one correspondence; and adjusting a target initial refresh rate of the plurality of initial refresh rates to the target configuration refresh rate.

In some examples, the peripheral circuit further includes a second register circuit configured to store the configuration mapping table; and the determining the target configuration refresh rate based on the temperature signal and the configuration mapping table includes: reading the second register circuit based on the temperature signal to determine the target configuration refresh rate.

In some examples, the configuration mapping table includes a plurality of sub-configuration mapping tables for recording the correspondence relationship between the configuration temperature sections and the configuration refresh rates; the reading the second register circuit based on the temperature signal to determine the target configuration refresh rate includes: decoding and generating a target address based on the temperature signal, wherein the target address is configured to indicate the physical address of a target sub-configuration mapping table of the plurality of sub-configuration mapping tables; and obtaining the target sub-configuration mapping table based on the target address and determining the target configuration refresh rate.

In some examples, the operation method further includes: updating the target initial refresh rate to the target configuration refresh rate; and send the target configuration refresh rate to a memory controller.

In some examples, the peripheral circuit further includes a fuse circuit configured to store the configuration mapping table. The operation method further includes: reading the configuration mapping table in the fuse circuit and storing the read configuration mapping table in the second register circuit.

In some examples, the initial refresh rate includes a basic refresh rate and an initial multiple value and any two initial refresh rates of the plurality of initial refresh rates have different initial multiple values; and the configuration refresh rate includes a basic refresh rate and a configuration multiple value and any two configuration refresh rates of the plurality of configuration refresh rates have different configuration multiple values; determining the target configuration refresh rate based on the temperature signal and the configuration mapping table includes: determining a configuration multiple value of the target configuration refresh rate based on the temperature signal and the configuration mapping table; and adjusting the target initial refresh rate to the target configuration refresh rate includes: updating the initial multiple value of the target initial refresh rate to the configuration multiple value of the target configuration refresh rate.

In some examples, the plurality of initial temperature sections include N initial temperature sections with N being an integer larger than 1; the configuration mapping table includes N configuration temperature sections, wherein the lowest temperature of the ith initial temperature section is different from the lowest temperature of the ith configuration temperature section; and/or the highest temperature of the ith initial temperature section is different from the highest temperature of the ith configuration temperature section with i being an integer larger than or equal to 1 and smaller than or equal to N.

In some examples, the operation method further includes: entering a refresh mode based on the current refresh command sent from the memory controller; and entering the refresh mode based on the next refresh command sent from the memory controller, wherein the target configuration refresh rate is configured to indicate the time interval between the next refresh command and the current refresh command.

In some examples, the operation method further includes: updating at least one of the configuration temperature sections in the configuration mapping table when the usage time of the memory is longer than or equal to a preset duration.

In the third aspect, examples of the present disclosure further provide a memory system, which includes: one or more memories in accordance with any one of the examples of the present disclosure in the first aspect; and a memory controller coupled to the one or more memories and configured to control the one or more memories.

In the fourth aspect, examples of the present disclosure further provide an electronic apparatus including the memory system in the above-described examples.

In examples of the present disclosure, the temperature sensing circuit senses the temperature of the memory and generates a temperature signal based on the sensed temperature, and the control logic circuit determines a target configuration refresh rate based on the temperature signal and the configuration mapping table and adjusts the target initial refresh rate to the target configuration refresh rate. As such, in the first aspect, a desirable refresh rate can be generated based on the data retention characteristics of the memory to avoid data loss and ensure data reliability; in the second aspect, the refresh rate is adjusted flexibly based on the data retention characteristics of the memory to avoid frequent refresh operations, reduce power consumption and prolong service life of the memory; and in the third aspect, the ranges of the temperature sections can be configured flexibly and the configuration mapping table can be customized to satisfy the data retention demands of the memory.

BRIEF DESCRIPTION OF THE DRAWINGS

FIG. 6 is a schematic diagram of a mode register in accordance with an example of the present disclosure.

FIG. 9 is a flowchart of an operation method of a memory in accordance with an example of the present disclosure.

DETAILED DESCRIPTION

Figure 1:
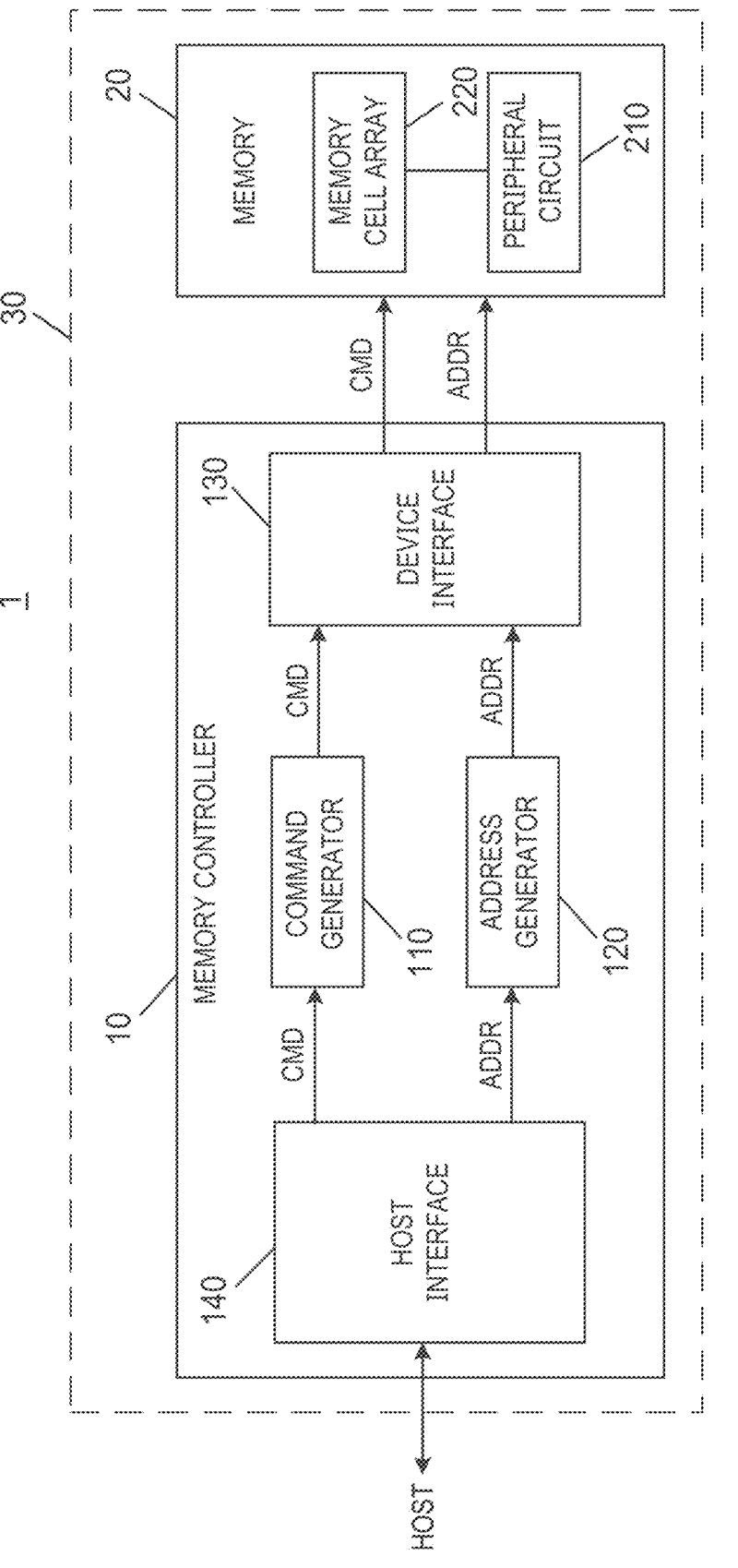
FIG. 1 is a schematic diagram of a system in accordance with an example of the present disclosure.

For understanding of the present disclosure, example implementations of the present disclosure will be described in more detail with reference to relevant accompanying drawings. Although example implementations of the present disclosure are illustrated in accompanying drawings, it should be understood that the present disclosure can be embodied in various forms and is not limited to specific implementations described herein. The implementations are provided for more thorough understanding of the present disclosure and to convey the scope the present disclosure fully to those skilled in the art.

In the description hereafter, many specific details are provided to facilitate more thorough understanding of the present disclosure. However, it is apparent for those skilled in the art that the present disclosure can be implemented without one or more of these details. In some examples, to avoid obscuring the present disclosure, some technical features well known in the art will not be described. That is to say, not all features of practical examples will be described herein and well-known functions and structures may not be described in detail.

Generally, terms should be understood at least in part from the usage in their contexts. For example, the term "one or more", as used herein, may be used to describe any feature, structure, or characteristic in a singular sense or may be used to describe combinations of features, structures or characteristics in a plural sense, depending at least in part upon context. Similarly, terms, such as "a," "an," or "the," again, may be understood to convey a singular usage or to convey a plural usage, depending at least in part upon context. In addition, it should be understood that the term "based on" is not necessarily intended to convey an exclusive set of factors and may, instead, allow for existence of additional factors not necessarily described expressly, also depending at least in part on context.

Terminology is used herein only for description of specific examples and in no way for limiting the present disclosure, unless defined otherwise. As used herein, the terms "a", "an" and "the" in singular forms are also intended to cover plural forms, unless the context clearly indicates otherwise. It is also be appreciated that terms "comprise", "comprising", "include" and/or "including", as used in the specification, specify presence of the mentioned features, integers, steps, operations, elements and/or components, but do not exclude presence or addition of one or more other features, integers, steps, operations, elements, components and/or combinations thereof. As used herein, the term "and/or" includes any and all combinations of relevant listed items.

For understanding of the present disclosure, detailed steps and structures will be provided in the following description to set fourth examples of the present disclosure. Detailed description of examples of the present disclosure is as follows, however the present disclosure may have other implementations in addition to the detailed description.

Volatile memories need to be refreshed periodically to retain the data stored in the memory cells. With the increase of temperature, the data retention characteristics of the memory cells deteriorates and therefore it may be useful to adjust refreshing frequencies (also referred to as refresh rates) of volatile memories based on temperature changes.

FIG. 1 is a schematic diagram of a system 1 in accordance with an example of the present disclosure. The system 1 can be a mobile phone, a desktop computer, a laptop computer, a tablet computer, a vehicle computer, a gaming console, a printer, a positioning device, a wearable electronic device, a smart sensor, a virtual reality (VR) device, an augmented reality (AR) device, or any other suitable electronic device having storage therein.

As shown in FIG. 1, the system 1 may include a host (HOST) and a memory system 30 that includes one or more memories 20 and a memory controller 10. The host may be a processor of an electronic apparatus, such as a central processing unit (CPU), or a system-on-chip (SOC) such as an application processor (AP). The host may be configured to send data to the memory 20 or receive data from the memory 20. The memory controller 10 is coupled to the memory 20 and the host and is configured to control the memory 20. The memory controller 10 can manage the data stored in the memory 20 and communicate with the host.

The memory controller 10 can be configured to control operations of the memory 20, such as read, erase, write and refresh operations. In some implementations, the memory controller 10 is further configured to process error correction codes (ECCs) with respect to the data read from or written to the memory 20. Any other suitable functions can be performed by the memory controller 10 as well, for example, formatting the memory 20.

In some implementations, the memory controller 10 and the one or more memory 20 may be integrated into various types of storage devices. For example, the memory controller 10 may be integrated into the northbridge in the main board of a computer or into the CPU of the computer directly, and a plurality of memories 20 may be integrated into the memory stick. That is, the memory system 30 can be implemented and packaged into different types of end electronic products.

The memory controller 10 may send data to the host or receive data from the host and may send commands (CMD) and addresses (ADDR) to the memory 20. The memory controller 10 may include a command generator 110, an address generator 120, a device interface 130 and a host interface 140. The host interface 140 may receive commands and addresses from the host. The command generator 110 may generate access commands, refresh commands and the like by decoding the commands received from the host and may provide access commands and refresh commands to the memory 20 through the device interface 130. Access commands may refer to the signals that instruct the memory 20 to write or read data by accessing the rows of a memory cell array 220 corresponding to the addresses. Refresh commands may refer to the signals that instruct the memory 20 to read and rewritten data by accessing the rows of the memory cell array 220 corresponding to the refresh addresses.

The address generator 120 in the memory controller 10 may generate row addresses and column addresses to be accessed in the memory cell array 220 by decoding the addresses received from the host interface 140. Moreover, the memory 20 may generate the addresses of the memory bank to be accessed when the memory cell array 220 includes a plurality of memory banks.

Moreover, the memory controller 10 may control memory operations, such as write and read operations, by providing various signals to the memory 20 via the device interface 130. For example, the memory controller 10 may provide write commands to the memory 20. A write command is used to instruct the memory 20 to perform a write operation for storing data into the memory 20. In some examples, the memory 20 includes a memory cell array 220 and a peripheral circuit 210. The memory cell array 220 includes a plurality of memory banks, each memory bank includes a plurality of memory blocks and each memory block includes multiple rows of memory cells and multiple columns of memory cells. Each row of memory cells are coupled with a corresponding word line and each column of memory cells are coupled with a corresponding bit line. The peripheral circuit 210 may write data to or read data from the memory cell array 220 based on the commands and addresses received from the memory controller 10, or provide, to the row decoder and column decoder, control signals (CTRL) for refreshing the memory cells included in the memory cell array 220. In other words, the peripheral circuit 210 may perform all the operations for processing the data in the memory cell array 220. The peripheral circuit 210 may include: a control circuit corresponding to each memory block, such as a sensing amplifier (SA) and a word line driver (WLD); a control circuit corresponding to each memory bank, such as a row decoder, a column decoder and the like; and a control circuit corresponding to all the memory banks, such as a command buffer, a command decoder, an address buffer, a data input/output cache, a mode register and the like.

The memory 20 may be a random access memory (RAM), such as a dynamic random access memory (DRAM), a synchronous DRAM (SDRAM), a static RAM (SRAM), a double data rate SDRAM (DDR SDRAM), a DDR2 SDRAM, a DDR3 SDRAM, a phase change RAM (PRAM), a magnetic RAM (MRAM), a resistive RAM (RRAM) or the like. Only a DRAM is taken as an example for the following description.

Figure 2:
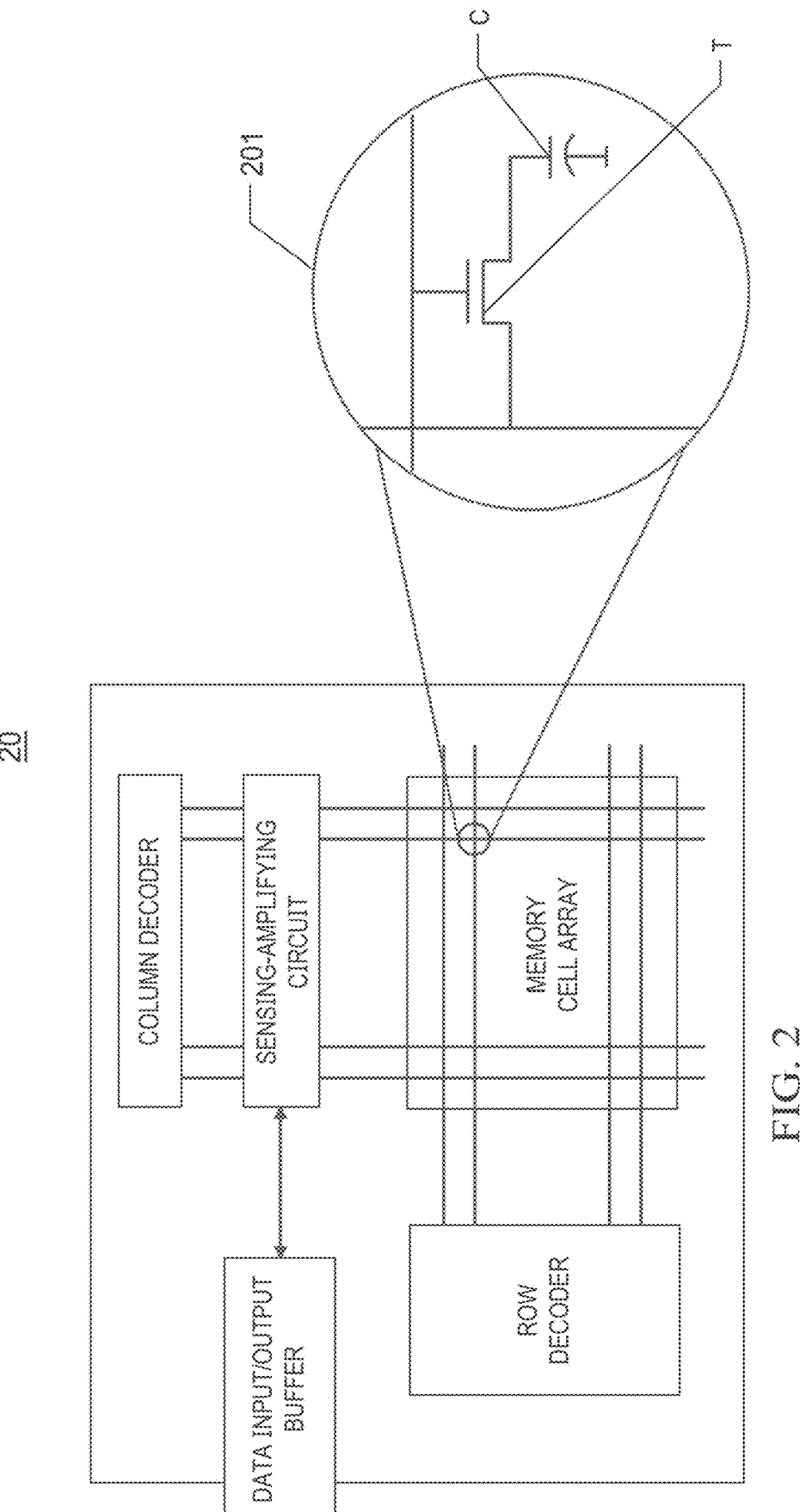
FIG. 2 is a schematic diagram of a DRAM in accordance with an example of the present disclosure.

FIG. 2 is a schematic diagram of a DRAM in accordance with an example of the present disclosure. With reference to FIG. 2, the DRAM includes at least one DRAM chip and each DRAM chip includes a memory cell array, in which a plurality of memory cells 201 are included and arranged in an array. Each memory cell 201 includes a transistor T and a capacitor C and functions mainly with the principle of representing a binary bit of 1 or 0 by the amount of charges stored in the capacitor. The memory cells are arranged in an array and may be considered as a typical grid structure, which can be seen in the following FIG. 7B as a reference. The memory cell array specifies addresses using rows and columns. The memory controller can independently access each memory cell in the DRAM chip and perform read, write or refresh operation on the data stored therein by designating intersections of rows and columns (by designating row addresses and column addresses of DRAM).

Figure 3:
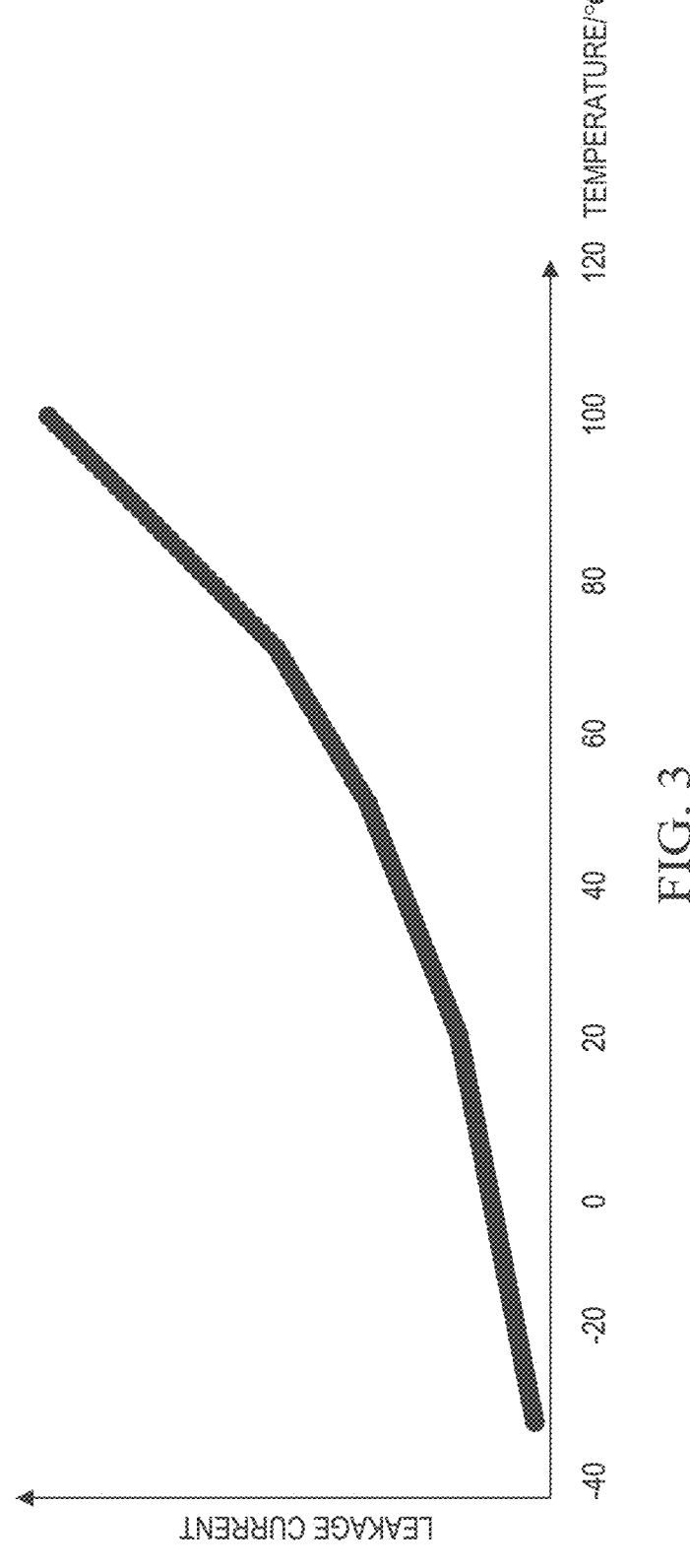
FIG. 3 is a graph illustrating leakage current vs. temperature in accordance with an example of the present disclosure.
Figure 4:
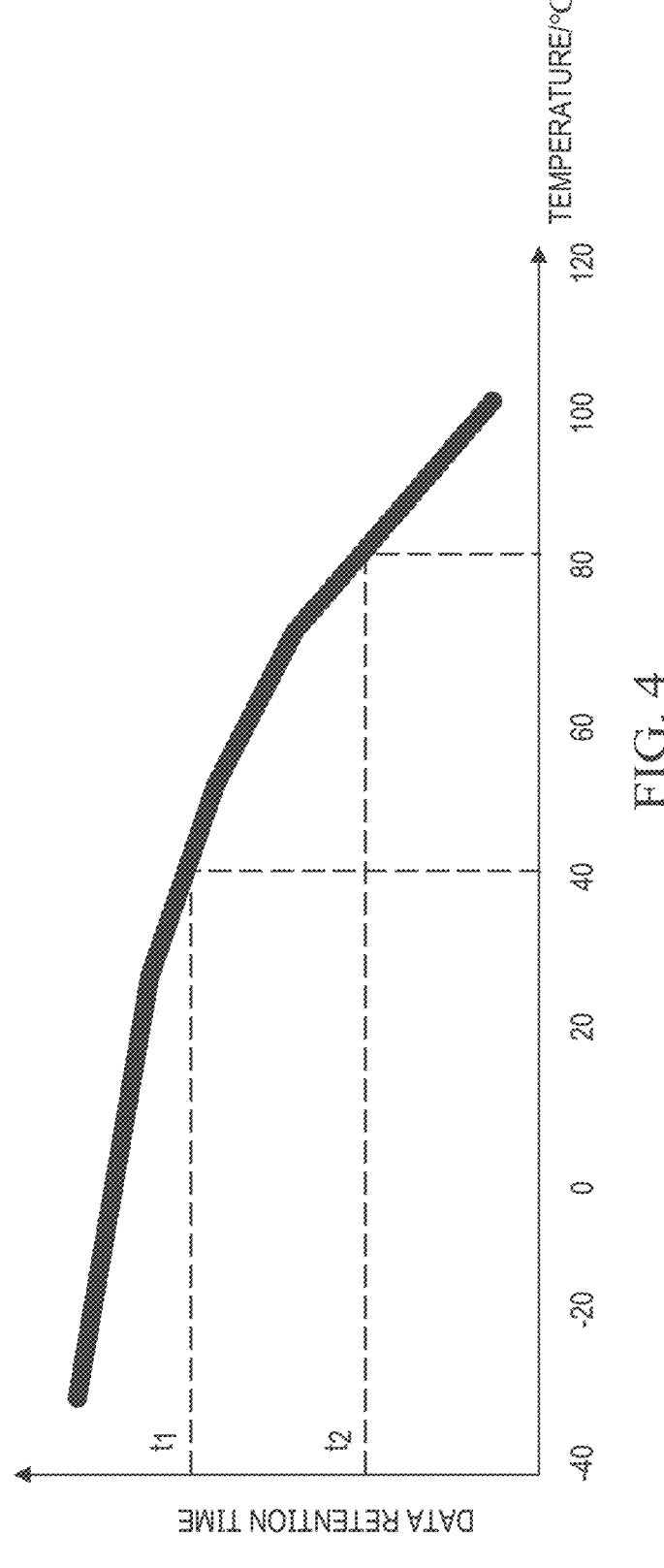
FIG. 4 is a graph illustrating data retention time vs. temperature in accordance with an example of the present disclosure.

The leakage current of a memory cell in the DRAM is proportional to temperature, e.g., increases with increasing of temperature, as shown in FIG. 3. Due to the limited charges stored in a memory cell, the data retention time of the memory cell is inversely proportional to temperature. For example, the data retention time is t1 at 40° C. and the data retention time is t2 at 80° C., t2 being shorter than t1, as shown in FIG. 4. In order to ensure reliability of data, DRAM needs to be refreshed periodically to retain the data stored in its memory cells.

The periodical refresh operation has two manners. In one of the manners, the memory controller issues refresh commands periodically and is responsible for data retention (also referred to as automatic refreshing). In the other of the manners, refresh signals are generated inside the memory (also referred to as self-refreshing). In an automatic refresh operation, the time interval between two refresh commands issued by the memory controller is usually related to temperature to make the data remain the same. If the time interval between two refresh commands is relatively short, refresh commands will consume too much time and in turn reduce the time for normal read and write operations. Therefore, the time interval should be updated according to the temperature, so that not only data can remain and more time can be provided for normal read and write operations. Moreover, refresh frequency can be reduced according to temperature change (e.g., temperature drop) to reduce power consumption.

The memory controller updates the time interval between two refresh commands according to the refresh rate registered in the mode register for the memory. For example, the memory can update the refresh rate according to temperature change, the mode register sends the updated refresh rate to the memory controller and the memory controller sends a refresh command to the memory based on the updated refresh rate. It can be understood that the memory controller is informed the time interval between two refresh commands by the mode register.

Figure 5:
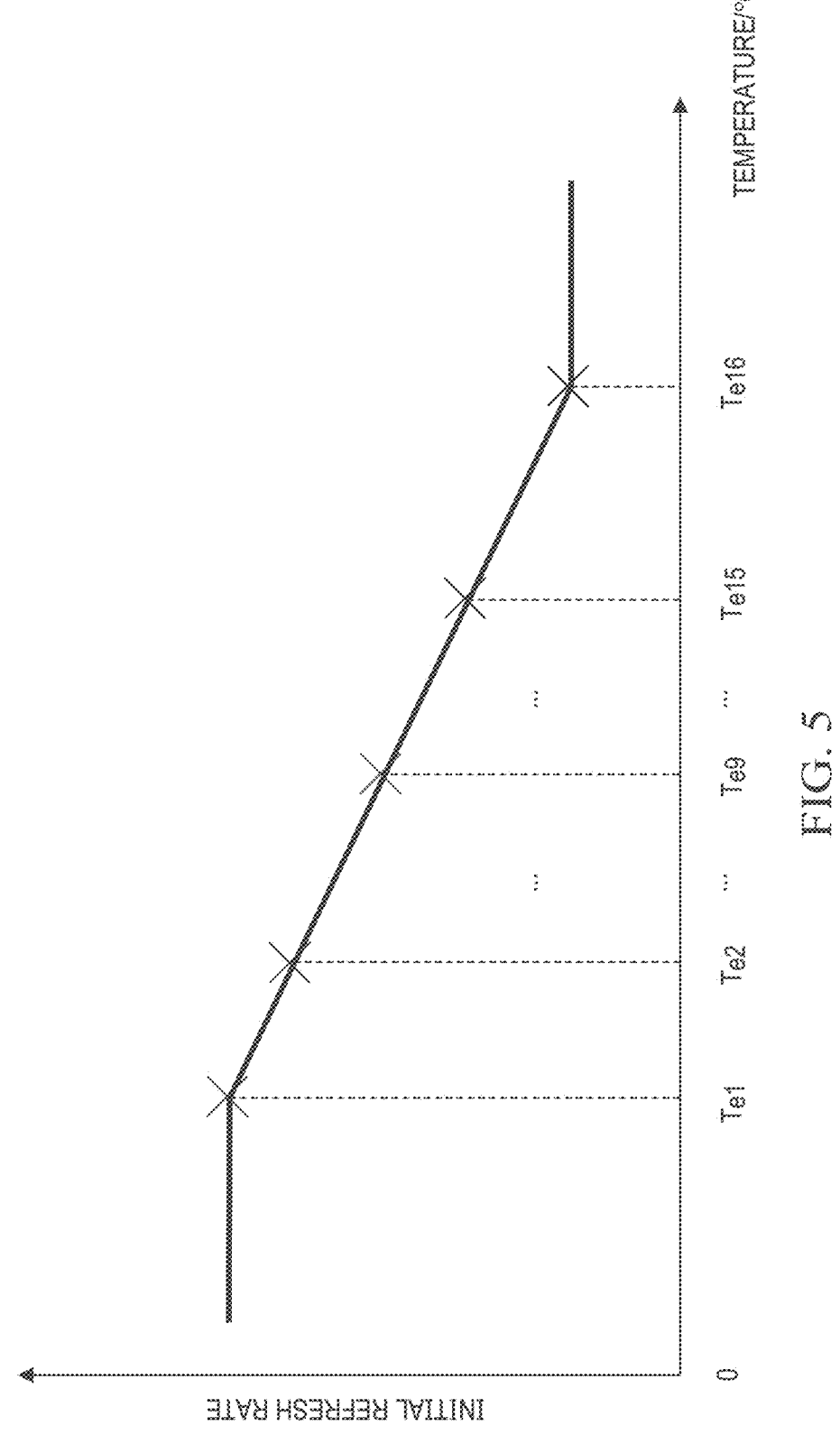
FIG. 5 is a graph illustrating initial refresh rate vs. initial temperature section in accordance with an example of the present disclosure.

A plurality of initial refresh rates corresponding to a plurality of initial temperature sections are registered in the mode register. For example, the operating temperature range of the memory is −25° C.≤T≤80, which can be divided into a plurality of temperature sections based on a plurality of initial values of temperature. Each initial temperature section corresponds to an initial refresh rate and different temperature sections correspond to different initial refresh rates. Illustratively, as shown in FIG. 5, 16 initial temperature values, for example, initial temperature values Te1, Te2 . . . Te16, are selected according to the operating temperature range, resulting in 17 initial temperature sections.

In accordance with the Joint Electron Device Engineering Council (JEDEC) protocol, 17 initial refresh rates, for example, a low temperature limit, a refresh rate 8×, . . . , a high temperature limit, as shown in FIG. 6, are registered in the mode register. Each initial refresh rate corresponds to a refresh rate code and different initial refresh rates correspond to different refresh rate codes. Illustratively, when the temperature of the memory comes into the second initial temperature section, the mode register sends the refresh rate code 5'b00001 corresponding to the initial refresh rate 8× to the memory controller, and the memory controller will perform an automatic refresh operation on the memory using the initial refresh rate 8×.

Since the plurality of initial temperature sections are fixed, it is difficult to adjust the ranges of the initial temperature sections. Therefore, the initial refresh rate corresponding to all the temperatures in the same initial temperature section is fixed. However, for different memories, capability of data retention of their memory cells may be different at a given temperature, and therefore it is difficult to generate the desirable refresh rate using fixed initial temperature sections.

Figure 7A:
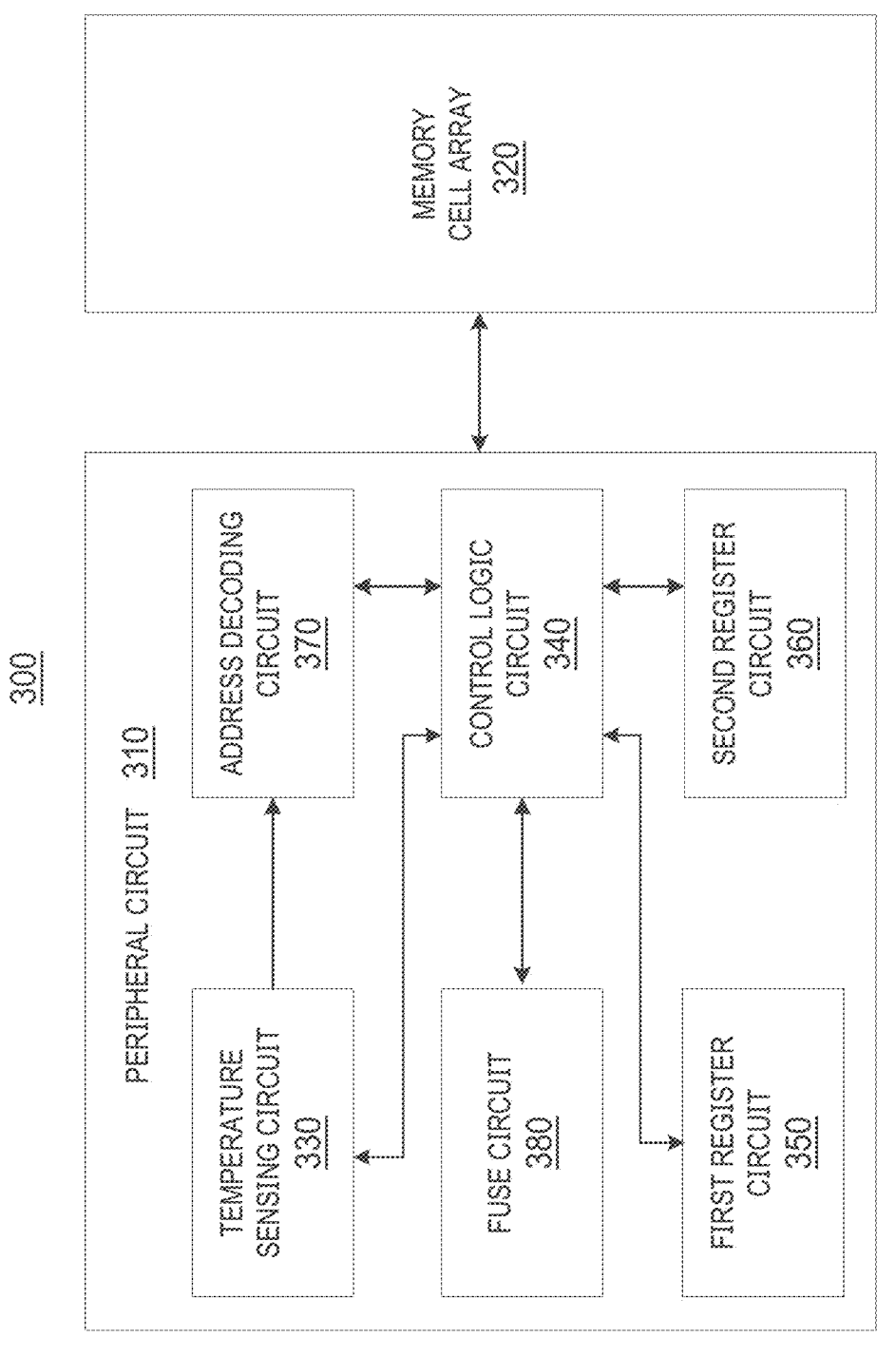
FIGS. 7A and 7B are schematic diagrams of a memory in accordance with an example of the present disclosure.
Figure 7B:
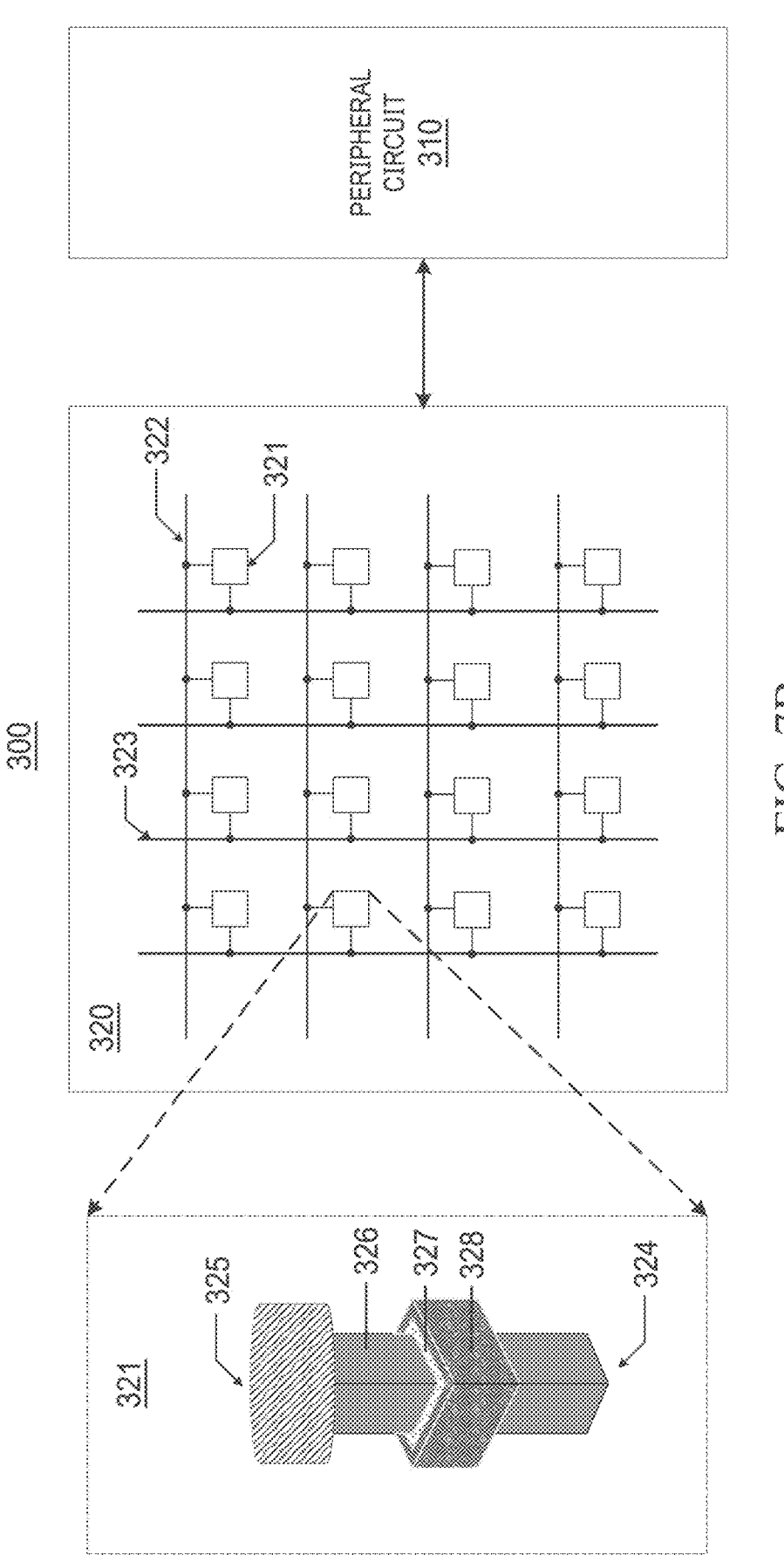

FIGS. 7A and 7B are schematic diagrams of a memory 300 in accordance with an example of the present disclosure. With reference to FIGS. 7A and 7B, the memory 300 includes a peripheral circuit 310, which includes: a first register circuit 350 configured to store a plurality of initial refresh rates that are in one-to-one correspondence to the plurality of initial temperature sections; a temperature sensing circuit 330 configured to sense the temperature of the memory 300 and generate a temperature signal based on the sensed temperature; a control logic circuit 340 configured to determine a target configuration refresh rate based on the temperature signal and a configuration mapping table and adjust the target initial refresh rate of the plurality of initial refresh rates to the target configuration refresh rate, wherein the configuration mapping table includes a plurality of configuration temperature sections and a plurality of configuration refresh rates that are in one-to-one correspondence.

In examples of the present disclosure, the memory 300 includes, but not limited to, a DRAM, a double data rate DRAM (a DDR DRAM), a low power double rate DRAM (an LPDDR DRAM), a graphics double data rate DRAM (a GDDR DRAM), a high bandwidth memory (HBM) and the like.

With reference to FIG. 7B, the memory 300 includes a plurality of word lines 322 and a plurality of bit lines 323 and the peripheral circuit 310 is coupled with the memory cell array 320 through the plurality of word lines 322 and the plurality of bit lines 323. The memory cell array 320 includes a plurality of memory cells 321 arranged in an array and each memory cell 321 includes a transistor 324 and an energy storage element 325 coupled with the transistor 324. The transistor 324 includes a semiconductor pillar 326, a gate dielectric layer 327 and a gate 328. The semiconductor pillar includes a source, a drain, and a channel between the source and the drain. The gate dielectric layer 327 covers the sidewalls of the channel. The gate 328 is in contact with at least one sidewall of the gate dielectric layer 327. A word line 322 is coupled with the gates of the memory cells 321 in the same row and a bit line 323 is coupled with the semiconductor pillars (e.g., the drains of the semiconductor pillars) of the memory cells 321 in the same column.

In an example, the memory cell 321 may be a volatile memory cell. For example, it may be a DRAM memory cell and the energy storage element 325 may be a capacitor. Of course, in other examples, the memory cell 321 may be a phase change memory cell and the energy storage element 325 may be a phase change storage layer; or the memory cell 321 may be a ferroelectric memory cell and the energy storage element 325 may be a ferroelectric storage layer. The present disclosure is not limited in this respect.

The first register circuit 350 may store a plurality of initial refresh rates corresponding to a plurality of initial temperature sections that are formed based on at least one initial temperature value each serving as a dividing point. Each initial temperature section corresponds to an initial refresh rate and different initial temperature sections correspond to different refresh rates. The first register circuit 350 includes, but not limited to, a mode register.

Illustratively, the first register circuit 350 stores 17 initial refresh rates, for example, a low temperature limit, a refresh rate 8×, . . . , a high temperature limit, as shown in FIG. 6. The 17 initial refresh rates correspond to 17 initial temperature sections that are formed based on 16 initial temperature values serving as dividing points, for example, initial temperature values Te1, Te2 . . . . Te16. Each initial refresh rate corresponds to a refresh rate code and different initial refresh rates correspond to different refresh rate codes.

A refresh rate refers to the frequency, at which the data stored in the memory are read from the memory and rewritten into the memory. By reading and rewriting the data stored in the memory periodically, the leakage currents of energy storage elements (e.g., capacitors) for data storage in the memory can be kept relatively small, so that the problem that the logic value "0" and the logic value "1" cannot be identified due to a relatively large leakage current can be avoided to ensure the reliability of the data stored in the memory. Generally, the higher the temperature of the environment, in which the memory operates, is, the faster the leakages in the energy storage element for data storage is and, therefore the higher the temperature of the memory is and the higher the refresh frequency is.

It is to be noted that the plurality of initial refresh rates stored in the first register circuit 350 are specified based on the JEDEC protocol and usually written into each die (finally packaged in the memory) during packaging. The plurality of initial refresh rates and the plurality of initial temperature sections corresponding to the plurality of initial refresh rates are fixed and therefore it is difficult to adapt to data retention characteristics of different memories. Therefore, the configuration mapping table provided in examples of the present disclosure may generate desirable refresh rates based on the data retention characteristics of the memory to satisfy the data retention demands of the memory. The configuration mapping table will be described in detail below and will not repeated here.

The temperature sensing circuit 330 may sense the temperature of the memory 300 and output a temperature signal based on the sensed temperature. In an example, the temperature sensing circuit 330 includes a temperature sensor that can convert an analog temperature signal into a digital temperature signal and send the digital temperature signal to the control logic circuit 340. The temperature signal output by the temperature sensor may be a voltage signal corresponding to the sensed temperature and there may be one or more temperature sensors. Although the circumstance in which the temperature sensing circuit 330 is in the memory 300 is described in the present example, the temperature sensing circuit 330 may be disposed outside the memory 300 and sense the temperature of the memory 300.

It is to be noted that a plurality of temperature sections can be formed according to the operating temperature range and different temperatures correspond to the same temperature signal or different temperature signals. For example, a first temperature and a second temperature belong to the same temperature section and may correspond the same temperature signals. For another example, a first temperature and a second temperature belong to different temperature sections and may correspond to different temperature signals.

In practical applications, at least one configuration temperature value can be selected according to the operating temperature range of the memory, a plurality of configuration temperature sections can be formed based on configuration temperature values as dividing points and a plurality of configuration temperature sections correspond to a plurality of configuration refresh rates, respectively. Here, selection of configuration temperature values may be determined based on the data retention characteristics of the memory itself and, when a plurality of configuration temperature values is selected, at least one of them may be different from the above-mentioned initial temperature values.

Illustratively, 16 configuration temperature values may be selected as dividing points to form 17 configuration temperature sections, for example, the configuration temperature sections Tc1, Tc2 . . . . Tc9 . . . . Tc16 and Tc17 in table 1, and the 17 configuration temperature sections correspond to 17 configuration refresh rates, for example, the configuration refresh rates RM1, RM2 . . . . RM9 . . . . RM16 and RM17 in table 1.

In an example, the 16 configuration temperature values may be 25° C., 30° C., 35° C., 40° C., 42° C., 45° C., 48° C., 50° C., 52° C., 55° C., 60° C., 65° C., 70° C., 75° C., 80° C. and 85° C., respectively. It is to be noted that the selection of configuration temperature values may be determined based on the characteristics of leakage current vs. temperature. For example, when the leakage current of a memory changes dramatically at a temperature, the temperature may be determined as a configuration temperature value. The above-mentioned values are only examples used to convey the present disclosure to those skilled in the art and the configuration temperature values are not limited thereto.

The control logic circuit 340 may receive a temperature signal, determine a target configuration refresh rate based on the received temperature signal and a configuration mapping table and adjust the initial refresh rate corresponding to the temperature signal (e.g., the target initial refresh rate) to a target configuration refresh rate. The mode register sends the refresh rate code corresponding to the target configuration refresh rate to the memory controller, and the memory controller will perform an automatic refresh operation on the memory at the target configuration refresh rate. Here, the target configuration refresh rate and the target initial refresh rate may be the same or different.

Figure 8:
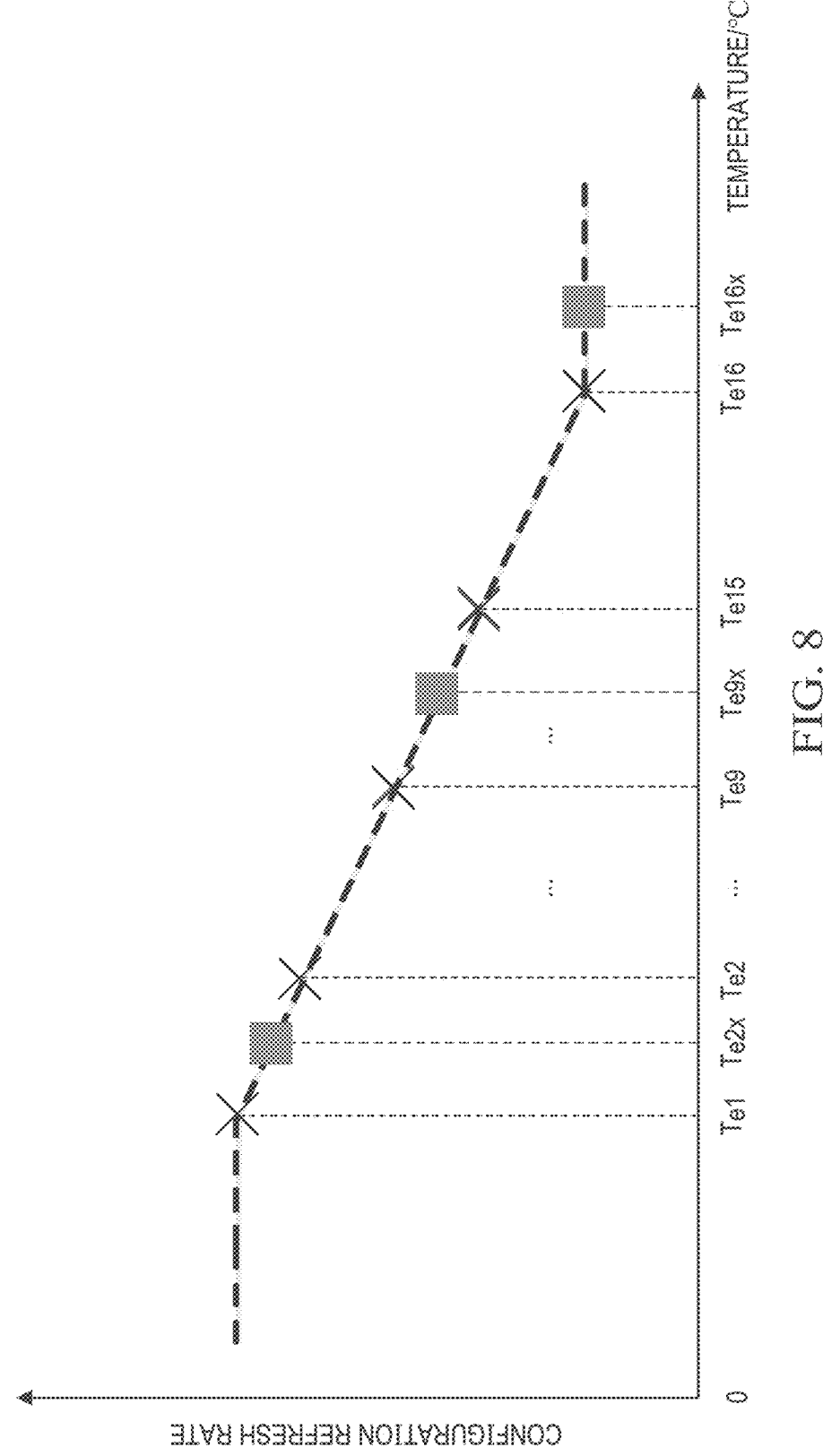
FIG. 8 is a graph illustrating configuration refresh rate vs. configuration temperature section in accordance with an example of the present disclosure.

Illustratively, with reference to FIGS. 6 and 8, when the temperature sensing circuit 330 senses that a temperature of the memory 300 is higher than the configuration temperature value Te2x and lower than or equal to the initial temperature value Te2 (e.g., located in the second initial temperature section), if no configuration mapping table is provided, the control logic circuit 340 determines the target initial refresh rate to be 8× based on the temperature, the first register circuit 350 sends the refresh rate code 5'b00001 corresponding to the refresh rate 8× to the memory controller, and the memory controller will perform an automatic refresh operation on the memory 300 using the refresh rate 8×. However, the refresh rate 8× corresponding to this temperature may be insufficient to retain the data stored in the memory 300, causing data loss and lower reliability of the memory 300.

Illustratively, with reference to FIGS. 6 and 8, when the temperature sensing circuit 330 senses that a temperature of the memory 300 is higher than the configuration temperature value Te2x and lower than or equal to the configuration temperature value Te3x (e.g., located in the third configuration temperature section), if a configuration mapping table is provided, the control logic circuit 340 determines the configuration refresh rate to be RM3 based on the temperature and the configuration mapping table, the first register circuit 350 sends the refresh rate code 5'b00010 corresponding to the refresh rate 6× to the memory controller, and the memory controller will perform an automatic refresh operation on the memory 300 using the refresh rate 6×. In this example, the target configuration refresh rate is different from the target initial refresh rate to avoid data loss and improve reliability of the memory 300.

Illustratively, when the temperature sensing circuit 330 senses that a temperature of the memory 300 is higher than the initial temperature value Te1 and lower than or equal to the configuration temperature value Te2x, if a configuration mapping table is provided, the control logic circuit 340 determines the configuration refresh rate to be RM2 (e.g., refresh rate 8×) based on the temperature and the configuration mapping table, the first register circuit 350 sends the refresh rate code 5'b00001 corresponding to the refresh rate 8× to the memory controller, and the memory controller will perform an automatic refresh operation on the memory 300 using the refresh rate 8×. In this example, the target configuration refresh rate may be the same as the target initial refresh rate.

It can be understood that the configuration temperature value Te2x is shifted to the left side of the initial temperature value Te2 (e.g., Te1<Te2x<Te2), and when the temperature change of the memory 300 is larger than the configuration temperature value Te2x and smaller than or equal to the initial temperature value Te2, the automatic refresh operation can be performed using an increased refresh rate based on the configuration mapping table to avoid data loss and improve reliability of the memory 300. In another example, the configuration temperature value Te2x may be shifted to the right side of the initial temperature value Te2 (e.g., Te2<Te2x<Te3), and when the temperature change of the memory 300 is larger than the initial temperature value Te2 and smaller than or equal to the configuration temperature value Te2x, the automatic refresh operation can be performed using a decreased refresh rate based on the configuration mapping table to not only avoid data loss, but also provide more time for normal read and write operations, so that increasing of power consumption due to frequent refresh operations can be avoided (e.g., power consumption is reduced). Selection of the configuration temperature value may be based on the data retention characteristics of the memory itself to generate a desirable refresh rate, satisfying data retention demands of the memory. However, the present disclosure is not limited in this respect.

TABLE 1

| Configuration mapping table | | |
| --- | --- | --- |
| sub-configuration mapping table | configuration temperature section | configuration refresh rate |
| the 1st sub-configuration mapping table | $T_{c1}$ | $RM_1$ |
| the 2nd sub-configuration mapping table | $T_{c2}$ | $RM_2$ |
| . . . | . . . | . . . |
| the 9th sub-configuration mapping table | $T_{c9}$ | $RM_9$ |
| . . . | . . . | . . . |
| the 16th sub-configuration mapping table | $T_{c16}$ | $RM_{16}$ |
| the 17th sub-configuration mapping table | $T_{c17}$ | $RM_{17}$ |

It is to be noted that the peripheral circuit 310 in examples of the present disclosure may further include other circuits known in the art, such as a sensing-amplifying circuit, a word line driving circuit, a row decoder, a column decoder, a data input/output buffer, that are not shown in FIG. 7A for brevity.

In practical applications, for different memories, different configuration mapping tables can be defined to improve flexibility of refresh rate adjustment. For example, before memories leave the factory, for different memories, developers design different configuration mapping tables and write (program) them into the memories.

In examples of the present disclosure, the temperature sensing circuit senses the temperature of the memory and generates a temperature signal based on the sensed temperature, and the control logic circuit determines a target configuration refresh rate based on the temperature signal and the configuration mapping table and adjusts the target initial refresh rate to the target configuration refresh rate. As such, in the first aspect, a desirable refresh rate can be generated based on the data retention characteristics of the memory to avoid data loss and ensure data reliability; in the second aspect, the refresh rate is adjusted flexibly based on the data retention characteristics of the memory to avoid frequent refresh operations, reduce power consumption and prolong service life of the memory; and in the third aspect, the ranges of the temperature sections can be configured flexibly and the configuration mapping table can be customized to satisfy the data retention demands of the memory.

In some examples, the peripheral circuit 310 further includes a second register circuit 360 configured to store the configuration mapping table; and the control logic circuit 340 is configured to read the second register circuit 360 based on the temperature signal to determine the target configuration refresh rate.

In an example of the present disclosure, the configuration mapping table can be saved in the second register circuit 360 and the control logic circuit 340 reads the second register circuit 360 based on the received temperature signal to determine the target configuration refresh rate. The second register circuit 360 includes, but not limited to, a mode register that may store various operation parameters, control parameters and other parameters for operating the memory 300, can be programmed to set a plurality of operation parameters and control parameters, and can store parameter codes. For example, the mode register may store parameter codes of a plurality of configuration refresh rates associated with temperatures (e.g., a configuration mapping table) and may be read to determine the target configuration refresh rate. In an example, the mode register may store data temporarily or permanently.

In some examples, the configuration mapping table includes a plurality of sub-configuration mapping tables configured to record the correspondence relationship between the configuration temperature sections and the configuration refresh rates and the peripheral circuit 310 further includes: an address decoding circuit 370 configured to decode and generate a target address based on the temperature signal, the target address is configured to indicate the physical address of the target sub-configuration mapping table of the plurality of sub-configuration mapping tables; and the control logic circuit 340 configured to obtain the target sub-configuration mapping table based on the target address and determine the target configuration refresh rate.

In examples of the present disclosure, the configuration mapping table includes a plurality of sub-configuration mapping tables and different sub-configuration mapping tables record the correspondence relationship between different configuration temperature sections and configuration refresh rates. For example, with reference to table 1, the configuration mapping table includes 17 sub-configuration mapping tables, the 1st sub-configuration mapping table records the correspondence relationship between the configuration temperature section Te1 and the configuration refresh rate RM1, the 2nd sub-configuration mapping table records the correspondence relationship between the configuration temperature section Tc2 and the configuration refresh rate RM2, . . . , the 17th sub-configuration mapping table records the correspondence relationship between the configuration temperature section Tc17 and the configuration refresh rate RM17. The number of sub-configuration mapping tables in the configuration mapping table is not limited to 17, and can be larger or smaller than 17.

The address decoding circuit 370 receives and decodes a temperature signal to generate a target address and sends the target address to the control logic circuit 340, which then reads the sub-configuration mapping table in the second register circuit 360 based on the target address to determine the target configuration refresh rate. It can be understood that a plurality of sub-configuration mapping tables is stored at different locations in the second register circuit 360 corresponding to different physical addresses. The target sub-configuration mapping table is one sub-configuration mapping table of the plurality of sub-configuration mapping tables and the target address is the physical address corresponding to the one sub-configuration mapping table.

Illustratively, the temperature of the memory 300 sensed by the temperature sensing circuit 330 at the first moment is 25° C. and the first temperature signal is output; the address decoding circuit 370 receives and decodes the first temperature signal to generate the first target address; the control logic circuit 340 reads the 1st sub-configuration mapping table in the second register circuit 360 based on the first target address, determines the target configuration refresh rate RM1, and the memory controller will perform an automatic refresh operation on the memory 300 at the refresh rate RM1. In this example, the target sub-configuration mapping table is the 1st sub-configuration mapping table, and the target address is the physical address of the 1st sub-configuration mapping table, e.g., the first target address.

Illustratively, the temperature of the memory 300 sensed by the temperature sensing circuit 330 at the second moment is 30° C. and the second temperature signal is output; the address decoding circuit 370 receives and decodes the second temperature signal to generate the second target address; the control logic circuit 340 reads the 2nd sub-configuration mapping table in the second register circuit 360 based on the second target address, determines the target configuration refresh rate RM2, and the memory controller will perform an automatic refresh operation on the memory 300 at the refresh rate RM2. In this example, the target sub-configuration mapping table is the 2nd sub-configuration mapping table, and the target address is the physical address of the 2nd sub-configuration mapping table, e.g., the second target address. The second moment can be earlier or later than the first moment, and as such the refresh rate of the memory can be adjusted in time when the temperature changes.

In some examples, the first register circuit 350 is further configured to update the target initial refresh rate to the target configuration refresh rate and send the target configuration refresh rate to the memory controller.

Illustratively, when the sensed temperature is higher than the configuration temperature value Te2x and lower than or equal to the initial temperature value Te2, the control logic circuit 340 determines the configuration refresh rate to be RM3 (e.g., refresh rate 6×) based on the temperature and the configuration mapping table, the first register circuit 350 updates the target initial refresh rate 8× corresponding to the temperature to the target configuration refresh rate 6× and sends the refresh rate code 5'b00010 corresponding to the refresh rate 6× to the memory controller, and the memory controller will perform an automatic refresh operation on the memory 300 at the refresh rate 6×.

In some examples, the peripheral circuit 310 further includes: a fuse circuit 380 configured to store the configuration mapping table; and the control logic circuit 340 configured to read the configuration mapping table in the fuse circuit 380 and store the read configuration mapping table into the second register circuit 360.

The fuse circuit 380 is configured to save the configuration mapping table and includes a programmable logic device, for example, a one time programmable (OTP) register, a few-time programmable (FTP) register or a multi-time programmable (MTP) register. The OTP includes a fuse OTP or an anti-fuse OTP. Before the memory 300 leaves the factory, the configuration mapping table can be written into the fuse circuit 380. Since the OTP, FTP and MTP are non-volatile, the configuration mapping table can still be saved when the memory 300 is power off to avoid loss of the configuration mapping table.

The control logic circuit 340 may first read the configuration mapping table in the fuse circuit 380 and then buffers the read configuration mapping table in the second register circuit 360, so that, when the temperature changes (e.g., increases or decreases), the control logic circuit 340 can determine the target configuration refresh rate based on the temperature signal output by the temperature sensing circuit 330 and the configuration mapping table buffered in the second register circuit 360 and adjust the refresh rate of the memory 300 to the target configuration refresh rate.

In examples of the present disclosure, by disposing a fuse circuit for storage of the configuration mapping table, due to the non-volatile property of the fuse circuit, the configuration mapping table can still be saved when the memory is power off to avoid loss of the configuration mapping table.

In some examples, an initial refresh rate includes a basic refresh rate and an initial multiple value and any two initial refresh rates of the plurality of initial refresh rates have different initial multiple values; and a configuration refresh rate includes a basic refresh rate and a configuration multiple value and any two configuration refresh rates of the plurality of configuration refresh rates have different configuration multiple values; the control logic circuit 340 is configured to determine the configuration multiple value of the target configuration refresh rate based on the temperature signal and the configuration mapping table; and the first register circuit 350 is further configured to update the initial multiple value of the target initial refresh rate to the configuration multiple value of the target configuration refresh rate.

Illustratively, with reference to FIG. 6, the 17 initial refresh rates may represent x times of the basic refresh rate, respectively, and the initial multiple values of any two initial refresh rates are different, for example, the initial multiple value of the refresh rate 8× is 8 and the initial multiple value of the refresh rate 6× is 6; and the way in which the plurality of configuration refresh rates are expressed, is similar to the way in which the plurality of initial refresh rates are expressed and will not repeated here.

Illustratively, the control logic circuit 340 determines the configuration multiple value of the target configuration refresh rate 6× to be 6 based on the temperature signal and the configuration mapping table; and the first register circuit 350 updates the initial multiple value 8 of the target initial refresh rate 8× to the configuration multiple value 6, so that the target initial refresh rate 8× is updated to the target configuration refresh rate 6×. It can be understood that, in this example, the target initial refresh rate may be updated to the target configuration refresh rate by updating the multiple of the basic refresh rate.

In some examples, the plurality of initial temperature sections include N initial temperature sections with N being an integer larger than 1; the configuration mapping table includes N configuration temperature sections, the lowest temperature of the ith initial temperature section is different from the lowest temperature of the ith configuration temperature section; and/or the highest temperature of the ith initial temperature section is different from the highest temperature of the ith configuration temperature section with i being an integer larger than or equal to 1 and smaller than or equal to N.

Illustratively, with reference to FIG. 8, the lowest temperature of the 2nd initial temperature section and the lowest temperature of the 2nd configuration temperature section are both Te1, the highest temperature of the 2nd initial temperature section is Te2, and the highest temperature of the 2nd configuration temperature section is Te2x with Te1<Te2x<Te2. In this example, the lowest temperature of the 2nd initial temperature section is the same as the lowest temperature of the 2nd configuration temperature section and the highest temperature of the 2nd initial temperature section is different from the highest temperature of the 2nd configuration temperature section. Of course, in other examples, the lowest temperature of the 2nd initial temperature section may be different from the lowest temperature of the 2nd configuration temperature section, for example, the lowest temperature of the 2nd initial temperature section is Te1 and the lowest temperature of the 2nd configuration temperature section is Te1x, wherein Te1x may be smaller or larger than Te1.

In practical applications, the range of each configuration temperature section can be adjusted flexibly according to the characteristics of the leakage current vs. temperature of the memory. For example, if the leakage current changes dramatically, the configuration temperature section may be adjusted to have a narrower range; and if the leakage current changes relatively smoothly, the configuration temperature section may be adjusted to have a wider range to adapt to the data retention characteristics of the memory. Therefore, a desirable refresh rate can be generated at a specific temperature.

It can be understood that, the lowest temperature and/or the highest temperature of at least one of the plurality of initial temperature sections can be shifted to obtain at least one configuration temperature section different from the at least one initial temperature section and thus satisfy the data retention demands of the memory.

In some examples, the control logic circuit 340 is further configured to: enter the refresh mode based on the current refresh command sent from the memory controller; and enter the refresh mode based on the next refresh command sent from the memory controller, wherein the target configuration refresh rate is configured to indicate the time interval between the next refresh command and the current refresh command.

The memory controller is coupled with the memory 300 and configured to control the logic operations of the memory 300, for example, write, read or refresh operations. The memory controller sends refresh commands to the memory 300 periodically to refresh the memory cells in the memory. The write, read or refresh operations are usually performed after the automatic refresh operation.

Illustratively, the first register circuit 350 sends the refresh rate code 5'b00010 to the memory controller, and the memory controller will perform an automatic refresh operation at the refresh rate 6× configured to indicate the time interval between the next refresh command and the current refresh command. It can be understood that when the refresh rate changes the time interval between the next refresh command and the current refresh command also changes accordingly. For example, when the refresh rate increases, the time interval between the next refresh command and the current refresh command becomes shorter and, for another example, when the refresh rate decreases, the time interval between the next refresh command and the current refresh command becomes longer.

In some examples, the memory 300 is further configured to update at least one of the configuration temperature sections in the configuration mapping table when the usage time of the memory 300 is longer than or equal to a preset duration.

Compared to the time at which the memory just leaves the factory, after some time of usage, performance of the memory may deteriorate, for example, the data retention time of memory cells may be shortened at a certain temperature. Therefore, when the usage time of the memory is longer than or equal to a preset duration, the lowest temperature and/or the highest temperature of a configuration temperature section can be adjusted to modify the configuration refresh rate corresponding to the temperature to a larger value and thus reduce the time interval between refresh commands. The preset duration includes a month, half a year, a year or longer time. It is to be noted that, when the usage time of the memory is longer than or equal to a preset duration, the configuration refresh rates corresponding to one or more configuration temperature sections in the configuration mapping table may be updated, but the present disclosure is not limited thereto in this respect.

In practical applications, after the chip test, a plurality of configuration temperature values may be written, in particular, into the second register circuit 360 and a plurality of configuration temperature sections can be formed based on a plurality of configuration temperature values as dividing points. The plurality of configuration temperature values may also be updated after chip packaging to update at least one of the configuration temperature sections in the configuration mapping table.

In some examples of the present disclosure, when the usage time of the memory is longer than or equal to a preset duration, at least one of the configuration temperature sections in the configuration mapping table is updated, so that the configuration refresh rate corresponding to each of the at least one configuration temperature section is updated. As such, the refresh rate of the memory can be adjusted in time according to the usage time of the memory, so that data loss is avoided and meanwhile the service life of the memory can be prolonged.

Based on the above-described memory, examples of the present disclosure further provide further provide an operation method of a memory.

FIG. 9 is a flowchart of an operation method of a memory in accordance with an example of the present disclosure. The memory includes a peripheral circuit including a first register circuit configured to store a plurality of initial refresh rates in one-to-one correspondence to a plurality of initial temperature sections. With reference to FIG. 9, the operation method includes at least the following steps.

In step S410, the temperature of the memory is sensed and a temperature signal is generated based on the sensed temperature.

In step S420, a target configuration refresh rate is determined based on the temperature signal and a configuration mapping table, wherein the configuration mapping table includes a plurality of configuration temperature sections and a plurality of configuration refresh rates that are in one-to-one correspondence.

In step S430, the target initial refresh rate of the plurality of initial refresh rates is adjusted to the target configuration refresh rate.

In some examples, the peripheral circuit further includes a second register circuit configured to store the configuration mapping table, and the above-described step S420 includes reading the second register circuit to determine the target configuration refresh rate based on the temperature signal.

In some examples, the configuration mapping table includes a plurality of sub-configuration mapping tables configured to record the correspondence relationship between the configuration temperature sections and the configuration refresh rates; and the above-described operation of reading the second register circuit to determine the target configuration refresh rate based on the temperature signal includes: decoding and generating a target address based on the temperature signal, the target address configured to indicate the physical address of the target sub-configuration mapping table of the plurality of sub-configuration mapping tables; and obtaining the target sub-configuration mapping table based on the target address and determining the target configuration refresh rate.

In some examples, the above-described operation method further includes: updating the target initial refresh rate to the target configuration refresh rate; and sending the target configuration refresh rate to the memory controller.

In some examples, the peripheral circuit further includes a fuse circuit configured to store the configuration mapping table. The operation method further includes: reading the configuration mapping table in the fuse circuit and storing the read configuration mapping table in the second register circuit.

In some examples, an initial refresh rate includes a basic refresh rate and an initial multiple value and any two initial refresh rates of the plurality of initial refresh rates have different initial multiple values; and a configuration refresh rate includes a basic refresh rate and a configuration multiple value and any two configuration refresh rates of the plurality of configuration refresh rates have different configuration multiple values.

The above-described step S420 includes determining the configuration multiple value of the target configuration refresh rate based on the temperature signal and the configuration mapping table.

The above-described step S430 includes updating the initial multiple value of the target initial refresh rate to the configuration multiple value of the target configuration refresh rate.

In some examples, the plurality of initial temperature sections include N initial temperature sections with N being an integer larger than 1; the configuration mapping table includes N configuration temperature sections, wherein the lowest temperature of the ith initial temperature section is different from the lowest temperature of the ith configuration temperature section; and/or the highest temperature of the ith initial temperature section is different from the highest temperature of the ith configuration temperature section with i being an integer larger than or equal to 1 and smaller than or equal to N.

In some examples, the above-described operation method further includes: entering a refresh mode based on the current refresh command sent from the memory controller; and entering the refresh mode based on the next refresh command sent from the memory controller, wherein the target configuration refresh rate is configured to indicate the time interval between the next refresh command and the current refresh command.

In some examples, the above-described operation method further includes: updating at least one of the configuration temperature sections in the configuration mapping table when the usage time memory is longer than or equal to a preset duration.

The operation method above has been described from the perspective of the memory and will not be repeated here for brevity.

Figure 10:
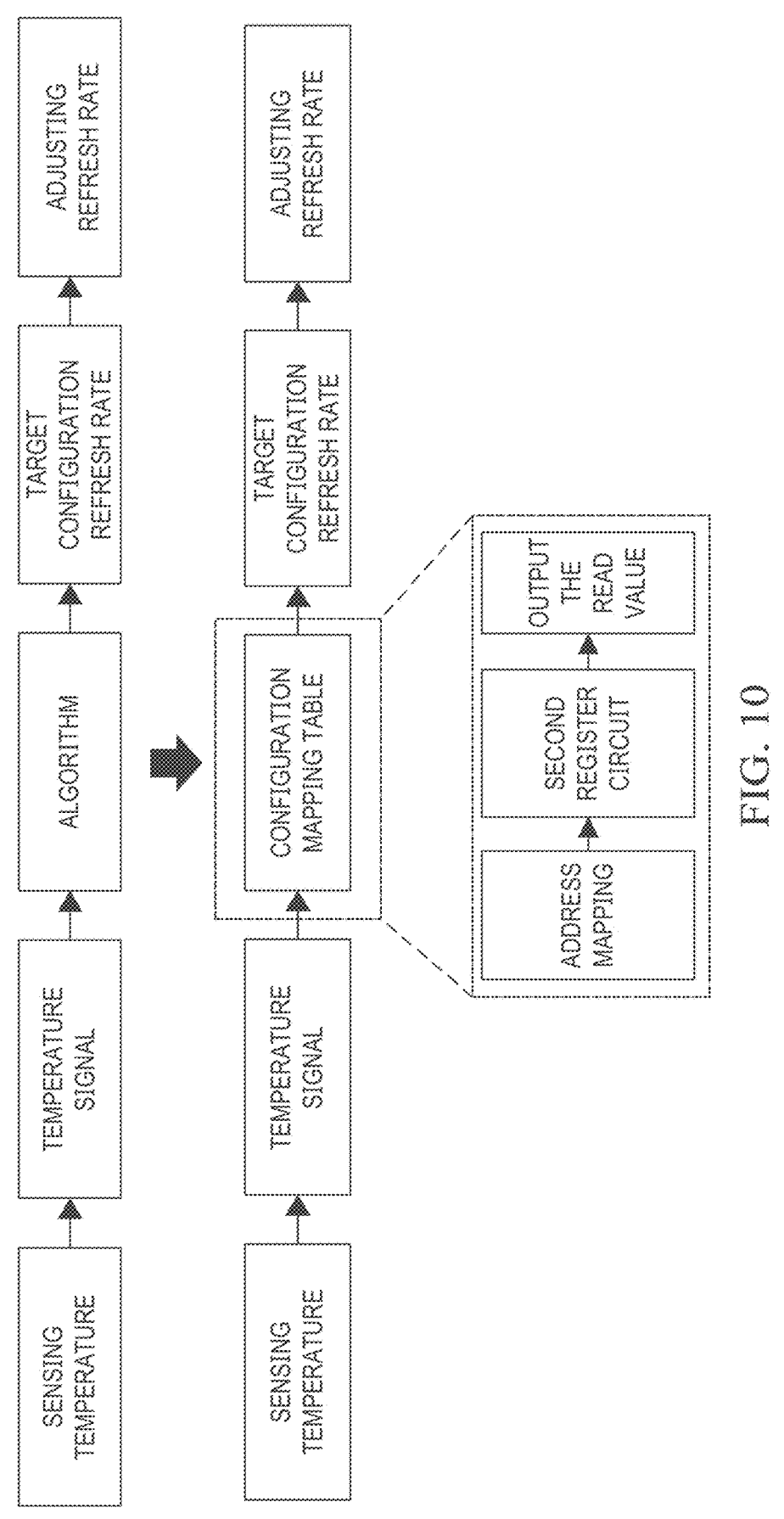
FIG. 10 is a schematic diagram illustrating adjustment of refresh rate in accordance with an example of the present disclosure.

FIG. 10 is a schematic diagram illustrating adjustment of refresh rate in an example of the present disclosure. With reference to FIG. 10, the temperature sensing circuit senses the temperature and generates a temperature signal based on the sensed temperature; the control logic circuit receives the temperature signal, determines a target configuration refresh rate based on the temperature signal and a configuration mapping table and adjusts a target initial refresh rate to the target configuration refresh rate. Here, the configuration mapping table is configured to store the result of a computer algorithm that can be developed in parallel with the circuit design of the memory and be written after the chip test. Of course, during any other circuit design and chip test, the algorithm can be optimized according to the circuit design and the test result.

In an example, with reference to FIG. 10, the address decoding circuit receives and decodes the temperature signal to generate a target address; the control logic circuit reads the target sub-configuration mapping table in a second register circuit based on the target address and outputs the read result (e.g., the read value) that is configured to indicate the target configuration refresh rate.

Figure 11:
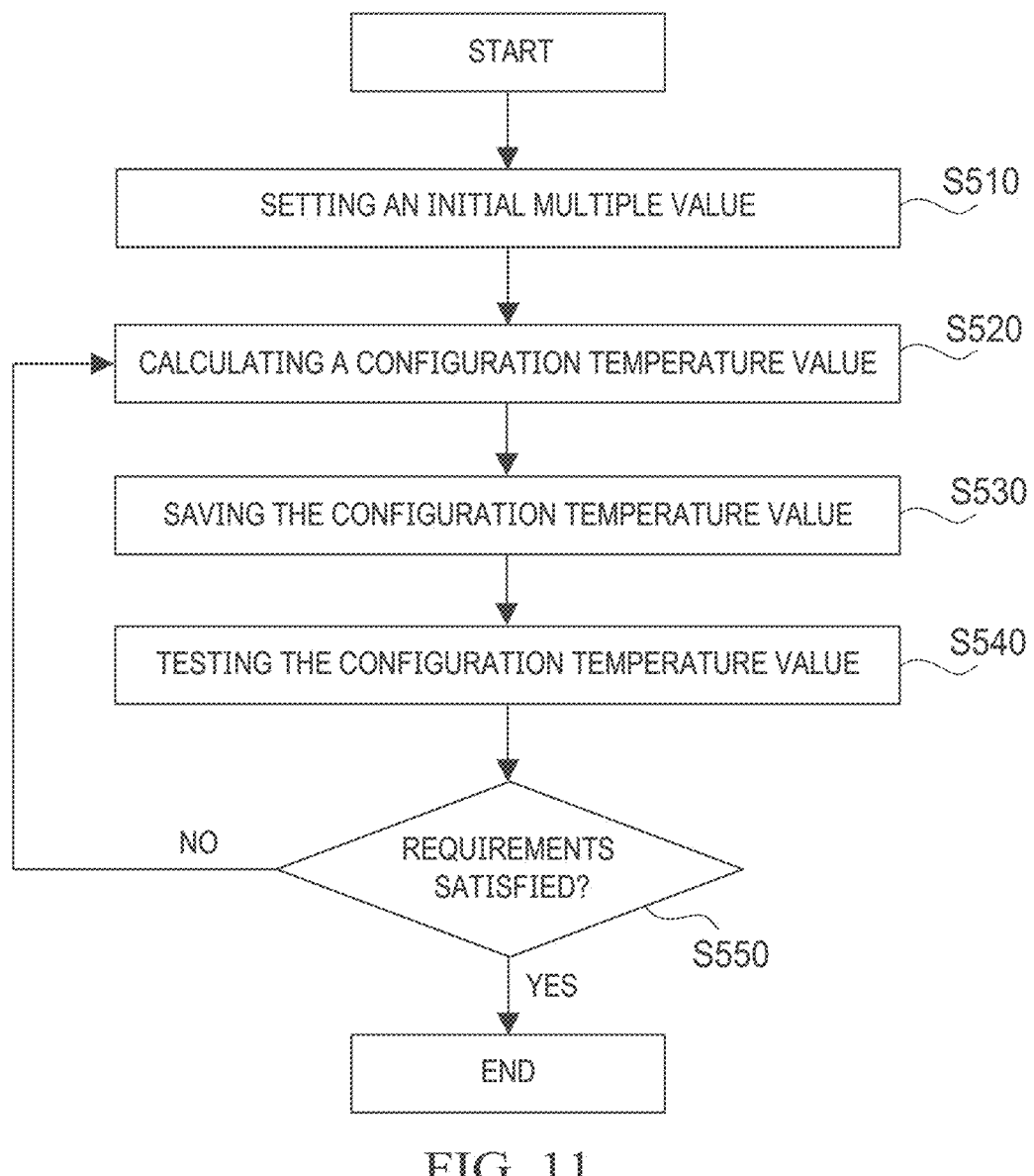
FIG. 11 is a flowchart of generating a configuration mapping table through an algorithm in accordance with an example of the present disclosure.

FIG. 11 is a flowchart of generating a configuration mapping table through an algorithm in accordance with an example of the present disclosure. The process of generating a configuration mapping table in examples of the present disclosure will be described hereafter in connection with FIG. 11 and the above-described examples.

In step S510, an initial multiple value is set. For example, the products of a plurality of multiples specified by the JEDEC protocol and a basic refresh rate x are written in a first register circuit respectively to store a plurality of initial refresh rates in the first register circuit. Each initial refresh rate corresponds to an initial temperature section and different initial refresh rates correspond to different initial temperature sections.

In step S520, a configuration temperature value is calculated. For example, a plurality of configuration temperature values associated with temperatures are calculated according to the data retention characteristics of the memory. For example, 16 configuration temperature values are obtained by the calculation, and are 25° C., 30° C., 35° C., 40° C., 42° C., 45° C., 48° C., 50° C., 52° C., 55° C., 60° C., 65° C., 70° C., 75° C., 80° C. and 85° C., respectively.

In step S530, the configuration temperature value is saved. A plurality of configuration temperature sections can be formed based on a plurality of configuration temperature values as dividing points and the correspondence relationship between the plurality of configuration temperature sections and a plurality of configuration refresh rates, e.g., a configuration mapping table, is established. The configuration mapping table is stored in a second register circuit.

In step S540, the configuration temperature value is tested. For example, a test temperature is provided and the memory is tested.

In step S550, it is determined whether the configuration temperature value satisfy requirements based on the test result; if yes, the process is completed; if no, the process go back to step S520 and the algorithm is adjusted to calculate a configuration temperature value again, a new configuration temperature section is generated based on the newly calculated configuration temperature value, and the new configuration temperature section is written into the second register circuit until requirements are satisfied. Here, at the test temperature, when the configuration refresh rate corresponding to the test temperature is taken as the rate for refreshing, it is sufficient for the memory to retain data and the configuration temperature value can be determined to satisfy requirements.

Examples of the present disclosure further provide a memory system. As shown in FIG. 1, the memory system 30 includes: one or more memories 300 in any one of the examples described above; and a memory controller 10 coupled with the one or more memories 300 and configured to control the one or more memories 300.

The memory 300 may correspond to the memory 20 in the example shown with reference to FIG. 1, and the functions and applications of the memory 300 and the memory controller 10 as well as the interacting operations therebetween will not be repeated here.

Examples of the present disclosure further provide an electronic apparatus including the memory system in the above-described examples.

It can be understood that "one example" or "an example" mentioned throughout the specification means that particular features, structures or characteristics in association with the example may be included in at least one example. Therefore, "in one example" or "in an example" mentioned throughout the specification refers not necessarily to the same example. Moreover, these particular features, structures or characteristics may be incorporated in one or more examples in any suitable manner. It can be understood that, in various examples of the present disclosure, the ordinal numbers of the various processes above are not intended to indicate that the processes must be performed in any sequential order, and the various processes should be performed in a sequential order determined depending on their functions and inherent logic. Implementation of examples of the present disclosure is not limited in this respect. The ordinal numbers in the above-mentioned examples of the present disclosure are only for the purpose of description and imply no preference for any one or more examples over the others.

It is to be noted that, terms "include", "comprise" or any other variants thereof are intended to encompass non-exclusive inclusion such that a process, method, article or device including a series of elements includes not only those elements, but also other elements that have not been listed explicitly, or further includes elements inherent in the process, method, article or device. Without any further limitations, an element defined by expression "including a . . . " does not exclude additional elements in the process, method, article or device including the element.

What have been described above are only implementations of the present disclosure. However, the protection scope of the present disclosure is not limited thereto, and variations or substitutions that easily occur to those skilled in the art in light of the technical contents disclosed by the present disclosure will fall within the scope of the present disclosure. Therefore, the protection scope of the present disclosure should be determined by the scope of the claims.

What is claimed is:

1. A memory comprising a peripheral circuit, the peripheral circuit comprising:

a first register circuit configured to store a plurality of initial refresh rates that are in one-to-one correspondence to a plurality of initial temperature sections;

a temperature sensing circuit configured to sense a temperature of the memory and generate a temperature signal based on the sensed temperature;

a control logic circuit configured to determine a target configuration refresh rate based on the temperature signal and a configuration mapping table and adjust a target initial refresh rate of the plurality of initial refresh rates to the target configuration refresh rate, wherein the configuration mapping table comprises a plurality of configuration temperature sections and a plurality of configuration refresh rates that are in one-to-one correspondence;

a second register circuit configured to store the configuration mapping table, wherein the control logic circuit is configured to read the second register circuit based on the temperature signal and determine the target configuration refresh rate, wherein the configuration mapping table comprises a plurality of sub-configuration mapping tables configured to record a correspondence relationship between the configuration temperature sections and the configuration refresh rates; and an address decoding circuit configured to decode and generate a target address based on the temperature signal, wherein the target address is configured to indicate a physical address of a target sub-configuration mapping table of the plurality of sub-configuration mapping tables, wherein the control logic circuit is configured to obtain the target sub-configuration mapping table based on the target address and determine the target configuration refresh rate.

2. The memory of claim 1, wherein the first register circuit is further configured to:

update the target initial refresh rate to the target configuration refresh rate; and send the target configuration refresh rate to a memory controller.

3. The memory of claim 1, wherein the peripheral circuit further comprises:

a fuse circuit configured to store the configuration mapping table; and wherein the control logic circuit is configured to read the configuration mapping table in the fuse circuit and store the read configuration mapping table in the second register circuit.

4. The memory of claim 1, wherein the initial refresh rate comprises a basic refresh rate and an initial multiple value and any two initial refresh rates of the plurality of initial refresh rates have different initial multiple values; and the configuration refresh rate comprises a basic refresh rate and a configuration multiple value and any two configuration refresh rates of the plurality of configuration refresh rates have different configuration multiple values;

the control logic circuit is configured to determine the configuration multiple value of the target configuration refresh rate based on the temperature signal and the configuration mapping table; and the first register circuit is further configured to update the initial multiple value of the target initial refresh rate to the configuration multiple value of the target configuration refresh rate.

5. The memory of claim 1, wherein the plurality of initial temperature sections comprise N initial temperature sections with N being an integer larger than 1; and the configuration mapping table comprises N configuration temperature sections, the lowest temperature of an ith initial temperature section is different from the lowest temperature of an ith configuration temperature section and/or the highest temperature of the ith initial temperature section is different from the highest temperature of the ith configuration temperature section with i being an integer larger than or equal to 1 and smaller than or equal to N.

6. The memory of claim 1, wherein the control logic circuit is further configured to:

enter a refresh mode based on a current refresh command sent from a memory controller; and enter the refresh mode based on a next refresh command sent from the memory controller, wherein the target configuration refresh rate is configured to indicate a time interval between the next refresh command and the current refresh command.

7. The memory of claim 1, the memory is further configured to:

update at least one of the configuration temperature sections in the configuration mapping table when a usage time of the memory is longer than or equal to a preset duration.

8. The memory of claim 1, wherein the physical address of the target sub-configuration mapping table obtained by decoding the temperature signal indicates a storage location for obtaining the target sub-configuration mapping table.

9. The memory of claim 1, wherein each of the plurality of sub-configuration mapping tables is stored at a different location in the second register circuit, and wherein the physical address corresponds to one of the different locations.

10. The memory of claim 1, wherein the control logic circuit adjusts the target initial refresh rate to the target configuration refresh rate responsive to the temperature signal having a value between an initial temperature section of the plurality of initial temperature sections and a configuration temperature section of the plurality of configuration temperature sections that is derived from the initial temperature section.

11. An operation method of a memory, the memory comprising a peripheral circuit that comprises a first register circuit configured to store a plurality of initial refresh rates in one-to-one correspondence to a plurality of initial temperature sections, the operation method comprising:

sensing a temperature of the memory and generating a temperature signal based on the sensed temperature;

determining a target configuration refresh rate based on the temperature signal and a configuration mapping table, wherein the configuration mapping table comprises a plurality of configuration temperature sections and a plurality of configuration refresh rates that are in one-to-one correspondence; and adjusting a target initial refresh rate of the plurality of initial refresh rates to the target configuration refresh rate, wherein:

the peripheral circuit further comprises a second register circuit configured to store the configuration mapping table;

the determining the target configuration refresh rate based on the temperature signal and the configuration mapping table comprises reading the second register circuit based on the temperature signal and determining the target configuration refresh rate;

the configuration mapping table comprises a plurality of sub-configuration mapping tables configured to record a correspondence relationship between the configuration temperature sections and the configuration refresh rates; and reading the second register circuit based on the temperature signal to determine the target configuration refresh rate comprises:

decoding and generating a target address based on the temperature signal, wherein the target address is configured to indicate a physical address of a target sub-configuration mapping table of the plurality of sub-configuration mapping tables; and obtaining the target sub-configuration mapping table based on the target address and determining the target configuration refresh rate.

12. The operation method of claim 11, further comprising:

updating the target initial refresh rate to the target configuration refresh rate; and send the target configuration refresh rate to a memory controller.

13. The operation method of claim 11, wherein the peripheral circuit further comprises a fuse circuit configured to store the configuration mapping table and the operation method further comprises:

reading the configuration mapping table in the fuse circuit and storing the read configuration mapping table in the second register circuit.

14. The operation method of claim 11, wherein the initial refresh rate comprises a basic refresh rate and an initial multiple value and any two initial refresh rates of the plurality of initial refresh rates have different initial multiple values; and the configuration refresh rate comprises the basic refresh rate and a configuration multiple value and any two configuration refresh rates of the plurality of configuration refresh rates have different configuration multiple values;

the determining the target configuration refresh rate based on the temperature signal and the configuration mapping table comprises:

determining the configuration multiple value of the target configuration refresh rate based on the temperature signal and the configuration mapping table; and the adjusting the target initial refresh rate to the target configuration refresh rate comprises:

updating the initial multiple value of the target initial refresh rate to the configuration multiple value of the target configuration refresh rate.

15. The operation method of claim 11, wherein the plurality of initial temperature sections comprise N initial temperature sections with N being an integer larger than 1; and the configuration mapping table comprises N configuration temperature sections, wherein the lowest temperature of an ith initial temperature section is different from the lowest temperature of an ith configuration temperature section and/or the highest temperature of the ith initial temperature section is different from the highest temperature of the ith configuration temperature section with i being an integer larger than or equal to 1 and smaller than or equal to N.

16. The operation method of claim 11, further comprising:

entering a refresh mode based on a current refresh command sent from a memory controller; and entering the refresh mode based on a next refresh command sent from the memory controller, wherein the target configuration refresh rate is configured to indicate a time interval between the next refresh command and the current refresh command.

17. The operation method of claim 11, further comprising:

updating at least one of the configuration temperature sections in the configuration mapping table when a usage time of the memory is longer than or equal to a preset duration.

18. A memory system, comprising:

one or more memories, each memory of the memories comprising a peripheral circuit, the peripheral circuit comprising:

a first register circuit configured to store a plurality of initial refresh rates that are in one-to-one correspondence to a plurality of initial temperature sections;

a temperature sensing circuit configured to sense a temperature of the memory and generate a temperature signal based on the sensed temperature;

a control logic circuit configured to determine a target configuration refresh rate based on the temperature signal and a configuration mapping table and adjust a target initial refresh rate of the plurality of initial refresh rates to the target configuration refresh rate, wherein the configuration mapping table comprises a plurality of configuration temperature sections and a plurality of configuration refresh rates that are in one-to-one correspondence;

a second register circuit configured to store the configuration mapping table, wherein the control logic circuit is configured to read the second register circuit based on the temperature signal and determine the target configuration refresh rate, wherein the configuration mapping table comprises a plurality of sub-configuration mapping tables configured to record a correspondence relationship between the configuration temperature sections and the configuration refresh rates; and an address decoding circuit configured to decode and generate a target address based on the temperature signal, wherein the target address is configured to indicate a physical address of a target sub-configuration mapping table of the plurality of sub-configuration mapping tables, wherein the control logic circuit is configured to obtain the target sub-configuration mapping table based on the target address and determine the target configuration refresh rate; and a memory controller coupled to the one or more memories and configured to control the one or more memories.

19. The memory system of claim 18, wherein:

the initial refresh rate comprises a basic refresh rate and an initial multiple value and any two initial refresh rates of the plurality of initial refresh rates have different initial multiple values;

the configuration refresh rate comprises the basic refresh rate and a configuration multiple value and any two configuration refresh rates of the plurality of configuration refresh rates have different configuration multiple values;

the control logic circuit determining the target configuration refresh rate comprises the control logic circuit determining the configuration multiple value of the target configuration refresh rate based on the temperature signal and the configuration mapping table; and the control logic circuit adjusting the target initial refresh rate comprises the control logic circuit updating the initial multiple value of the target initial refresh rate to the configuration multiple value of the target configuration refresh rate.

* * * * *